United States Patent
Gilad-Bachrach et al.

(10) Patent No.: US 9,946,970 B2
(45) Date of Patent: Apr. 17, 2018

(54) NEURAL NETWORKS FOR ENCRYPTED DATA

(71) Applicant: Microsoft Technology Licensing, LLC., Redmond, WA (US)

(72) Inventors: Ran Gilad-Bachrach, Bellevue, WA (US); Thomas William Finley, Bellevue, WA (US); Mikhail Bilenko, Redmond, WA (US); Pengtao Xie, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 666 days.

(21) Appl. No.: 14/536,145

(22) Filed: Nov. 7, 2014

(65) Prior Publication Data

US 2016/0350648 A1    Dec. 1, 2016

(51) Int. Cl.
  *G06N 3/08*    (2006.01)
  *G06N 3/04*    (2006.01)
  *H04L 9/00*    (2006.01)

(52) U.S. Cl.
  CPC ............ *G06N 3/08* (2013.01); *G06N 3/0481* (2013.01); *H04L 9/008* (2013.01)

(58) Field of Classification Search
  CPC ................................ G06N 3/0481; G06N 3/08
  See application file for complete search history.

(56) References Cited

U.S. PATENT DOCUMENTS

| | | |
|---|---|---|
| 8,681,973 B2 | 3/2014 | Weinman |
| 8,861,716 B2 | 10/2014 | Halevi et al. |
| 2008/0019511 A1* | 1/2008 | Akiyama ............ G06F 7/724 708/270 |
| 2012/0201378 A1 | 8/2012 | Nabeel et al. |

(Continued)

OTHER PUBLICATIONS

Kocarev et al, "Public-Key Encryption Based on Chebyshev Maps" Institute for Nonlinear Science, University of California, San Diego 9500 Gilman Drive, La Jolla, CA 92093-0402 2003 IEEE.*

(Continued)

*Primary Examiner* — Luis Sitiriche
(74) *Attorney, Agent, or Firm* — Shook, Hardy & Bacon, L.L.P.

(57) ABSTRACT

Embodiments described herein are directed to methods and systems for performing neural network computations on encrypted data. Encrypted data is received from a user. The encrypted data is encrypted with an encryption scheme that allows for computations on the ciphertext to generate encrypted results data. Neural network computations are performed on the encrypted data, using approximations of neural network functions to generate encrypted neural network results data from encrypted data. The approximations of neural network functions can approximate activation functions, where the activation functions are approximated using polynomial expressions. The encrypted neural network results data are communicated to the user associated with the encrypted data such that the user decrypts the encrypted data based on the encryption scheme. The func- (Continued)

tionality of the neural network system can be provided using a cloud computing platform that supports restricted access to particular neural networks.

17 Claims, 11 Drawing Sheets

(56) References Cited

U.S. PATENT DOCUMENTS

| | | |
|---|---|---|
| 2012/0213359 A1 | 8/2012 | Troncoso Pastoriza et al. |
| 2013/0097417 A1 | 4/2013 | Lauter et al. |
| 2014/0177828 A1 | 6/2014 | Loftus et al. |
| 2014/0233726 A1 | 8/2014 | Yajima et al. |

OTHER PUBLICATIONS

Zhu et al, "Optical image encryption based on the generalized fractional convolution operation" Optic Communications 195 (2001) 371-381.*

J. Yuan, S. Yu: "Privacy preserving back-propagation neural network learning made practical with cloud computing", IEEE Transactions on Parallel and Distributed Systems, vol. 25, No. 1, Jan. 11, 2013 (Jan. 11, 2013), pp. 212-221, XP011532592, DOI: 10.1109/TPDS.2013.18 chapters 3 and 4.

M. Barni et al: "A privacy-preserving protocol for neural-network-based computation", Proceedings of the 8th Workshop on Multimedia and Security (MM&SEC'06), Sep. 26, 2006 (Sep. 26, 2006), pp. 146-151, XP055296362, DOI: 10.1145/1161366.1161393 chapters 3 and 4.

P. Shuting et al: "Oblivious infinite derivable function evaluation and its application", Proceedings of the 2nd International Symposium on Web Information Systems and Applications (WISA'09), May 22, 2009 (May 22, 2009), pp. 92-95, XP055296380, ISBN: 978-952-5726-00-8 chapters I, IV and V.

R. Livni et al: "On the computational efficiency of training neural networks", arXiv:1410.1141v2, Oct. 28, 2014 (Oct. 28, 2014), XP055296368, Retrieved from the Internet: URL:https://arxiv.org/abs/1410.1141v2 [retrieved on Aug. 17, 2016] chapters 1 and 4.

S. G. Teo et al: "Privacy preserving support vector machine using non-linear kernels on Hadoop Mahout", Proceedings of the 16th International Conference on Computational Science and Engineering (CSE'13), Dec. 3, 2013 (Dec. 3, 2013), pp. 941-948, XP032573323, DOI: 10.1109/CSE.2013.200 chapters II, IV and VI.

Anonymous: "Reviews of paper 'CryptoNets: applying neural networks to encrypted data with high throughput and accuracy' submitted to ICML'16", The 33rd International Conference on Machine Learning (ICML'16), Jun. 14, 2016 (Jun. 14, 2016), XP055296394, Retrieved from the Internet: URL:http://icml.cc/2016/reviews/113.txt [retrieved on Aug. 18, 2016] the whole document.

R. Bost et al: "Machine learning classification over encrypted data", Cryptology ePrint Archive Report, No. 2014/331 Aug. 3, 2014 (Aug. 3, 2014), XP061016720, Retrieved from the Internet: URL:https://eprint.iacr.org/20141331/20140803:223443 [retrieved on Aug. 4, 2014] chapter 7.

T. Graepel et al: "ML confidential: machine learning on encrypted data", Lecture Notes in Computer Science,vol. 7839, Nov. 28, 2012 (Nov. 28, 2012), pp. 1-21, XP047027299, DOI: 10.1007/978-3-642-37682-5 1 the whole document.

International Search Report and Written Opinion dated Sep. 5, 2016 for International Patent Application No. PCT/US2015/058714, 14 pages.

* cited by examiner r=10 r=50

NEURAL NETWORKS FOR ENCRYPTED DATA

BACKGROUND

Neural networks generally refer to computation models with the capacity for machine learning and pattern recognition. A neural network can be defined by a set of input neurons which are activated by input data. After the input data is weighted and transformed by a function, the activations of the neurons are passed to other neurons. The process is repeated until an output neuron is activated to generate output results data associated with the input data. Neural network functionality and output results data can be based on various types of fields including speech recognition, handwriting recognition, computer vision, and natural language processing.

SUMMARY

This Summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to methods, systems, and computer storage media for performing neural network computations on encrypted data. Encrypted data having ciphertext is received from a user. The encrypted data is encrypted with an encryption scheme that allows for computations on the ciphertext to generate encrypted results data. The encryption scheme can be a fully homomorphic encryption scheme that supports neural network computations on encrypted data. Neural network computations are performed on the encrypted data, using approximations of neural network functions to generate encrypted neural network results data from encrypted data. The approximated neural network functions can be activation functions, where the activation functions are approximated using polynomial expressions. The encrypted neural network results data are communicated to the user associated with the encrypted data such that the user decrypts the encrypted data based on the encryption scheme. In embodiments, the functionality of the neural network system is provided using a cloud computing platform that supports restricted access to the particular neural networks based on an encryption mechanism, such as, public cryptography.

BRIEF DESCRIPTION OF THE DRAWINGS

The present invention is described in detail below with reference to the attached drawing figures, wherein:

FIGS. 3A-3B are graphical representations of approximations of neural network functions in neural network training and neural network computations, in accordance with embodiments described herein;

DETAILED DESCRIPTION

Figure 1:
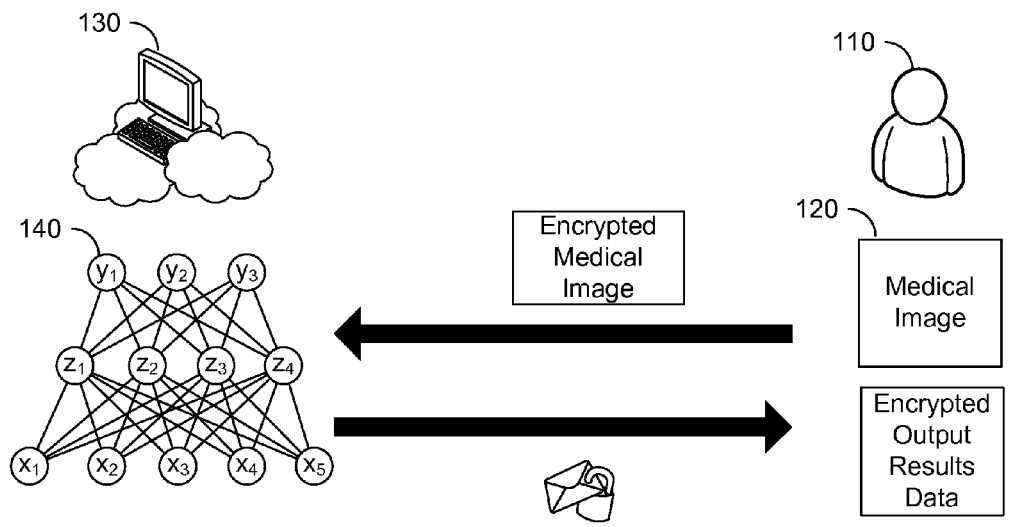
FIG. 1 is a schematic showing an exemplary method for performing neural network computations based on approximations of neural network functions, in accordance with embodiments described herein.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments are described with reference to neural network computations with approximations of neural network functions, and by way of example, the neural network computations are performed for making predications based on encrypted data in a cloud computing platform operating environment. However, neural network models can be used for a variety of different types of neural network computations and in different types of operating environments, the embodiments described herein are merely exemplary. It is contemplated that the techniques described may be extended to other implementation contexts.

Neural networks generally refer to computation models with the capacity for machine learning and pattern recognition. A neural network can be defined by a set of input neurons which are activated by input data. A neural network consists of a set of neurons, which are organized into layers. Typically, a neural network consists of an input layer which represents features, and an output layer which represents labels and several hidden layers. Neurons in adjacent layers can be connected with edges, where weights are associated. The weight parameters are learned in a training phase and can be use dot make predictions.

In operation, after the input data is weighted and transformed by a function, the activations of the neurons are passed to other neurons. The process is repeated until an output neuron is activated to generate output results data associated with the input data. For example, a predication can be made starting from an input layer with forward activation computed layer by layer. Neural network functionality and output results data can be based on other types of fields including speech recognition, handwriting recognition, computer vision, and natural language processing.

Neural network can be implanted different types of operating environments. For example, a cloud computing platform implementation of neural networks can provide scalable and efficient neural network functionality. A cloud computing platform may span wide geographic locations, including countries and continents. The service-application components (e.g., tenant infrastructure or tenancy) of the cloud computing platform may include nodes (e.g., computing devices, processing units, or blades in a server rack) that are allocated to run one or more portions of a tenant's services and applications. When more than one application is being supported by the nodes, the nodes may be partitioned into virtual machines or physical machines. The virtual machines or physical machines run each application concurrently in individualized computing environments. The computing environments support the resources and/or operating systems specific to each application. Further, each application may be divided into functional portions such that each functional portion is able to run on a separate virtual machine or physical machine. The cloud computing platform can support, in particular, an implementation of a neural network machine learning technology to advantageously provide advanced machine learning algorithms in addition to management and operational infrastructure of the cloud computing platform. Other types of operating environments are contemplated with embodiments described herein.

In a cloud computing platform machine learning implementation of neural networks, a trained neural network can be placed on cloud computing platform components to perform neural network computations. Neural network computations may specifically be performed to make predication based on user input data. In operation, a user can upload their data to the cloud computing platform and grant the cloud computing platform components full access to the data. Neural network computation can performed using Neural network models that are trained on plaintext or unencrypted data. Specifically, neural network models can be trained on plaintext or unencrypted data to perform predictions based on user query data.

Regulatory compliance, security, and privacy restrictions associated with data may necessitate the encryption of the data prior to performing neural network computations. By way of example, medical records, financial data, Personally Identifiable Information (PII) data, and government documents can be associated with restrictions that limit the capacity for machine learning operations to be performed on the user data. Unencrypted data is different from encrypted data in that encrypted data is encoded such that only authorized parties can read the data. When data are encrypted, the content of the data is denied to an interceptor. In this regard, conventional neural networks models do not support neural network computations on encrypted data because the neural network models are not configured to perform computations on encrypted data.

Embodiments of the present invention provide simple and efficient methods and systems for performing neural network computations on encrypted data. At a high level, a user can encrypt data and communicate the encrypted data or ciphertext to a cloud computing platform. The cloud computing platform can perform neural network computations to make predictions on the encrypted data and generate encrypted results. The cloud computing platform can communicate the encrypted results back to the user. The user can then decrypt the results to identify the plaintext predictions. As such, the cloud computing platform does not have access to either the input query data or the output results data. Advantageously, the embodiments described herein avoid loss of predictive performance in comparison with unencrypted prediction.

In advance of receiving input query data for processing and making predications, a cloud computing platform can support training and providing neural network models to provide neural network functionality described herein. In particular, a trained neural network can be used to make predictions based on user data. For example, medical images can be processed using a neural network to make predictions on diseases associated with the medical images. In embodiments described herein, neural network predictive function, and the capacity for the neural network to generate prediction results, can be specifically based on encrypted user data. By way of example, the disclosure of patient medical records is restricted by regulations in order to protect patient privacy. Medical images of patient data cannot be shared to external parties without meeting certain requirements. Nonetheless, when the user data is encrypted to protect data and to meet restrictions on data accessibility, a third party (e.g., provider of cloud computing platform) cannot have access to the data without the ability to view or decrypt the data all the while still performing neural network computations to generate encrypted results data.

As such, in embodiments described herein, user data can be encrypted and communicated to the cloud computing platform. The cloud computing platform can run neural network computations on the encrypted data and generate encrypted results which can be communicated to the user to decrypt the results. In this regard, both the input data and the output data are encrypted to meet regulatory requirements and maintain privacy. Advantageously, the encrypted results (e.g., prediction results) based on encrypted data is the same as if the encrypted results were generated from plaintext.

Figure 2:
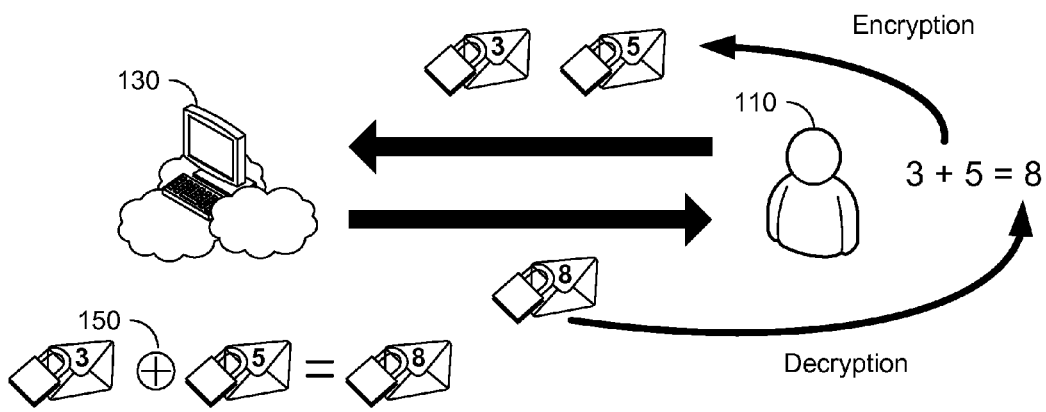
FIG. 2 is a schematic showing an exemplary method for performing neural network computations based on approximations of neural network functions, in accordance with embodiments described herein.

Performing neural network computations on encrypted data is facilitated by homomorphic encryption. Homomorphic encryption can refer to an encryption scheme which allows computations over encrypted data. With reference to FIG. 1 and FIG. 2, FIG. 1 and FIG. 2 provide a high level schematic that illustrates an implementation of the methods and systems described herein. A user 110, user data 120, a cloud computing platform 130 and a neural network 140. A user 110 can generally refer to an entity (e.g., individual, hospital, research facility, company) that is associated with the user data 120 (e.g., medical images, financial data, PII). In particular, with continued reference to FIG. 2, by way of example, when the user 110 wants to compute the sum of 3 and 5 without sharing the actual numbers, the user can encrypt 3 and 5 into ciphertext, and communicate the encrypted numbers to the cloud computing platform 130 with a request to add the numbers together. The neural network 140 running on the cloud computing platform 130 can perform computations 150 (e.g., addition) to add the integers together and receive a result that is encrypted. The encrypted results can be communicated to the user, upon which the user decrypts the encrypted results to view the result 8 in plaintext.

With homomorphic encryption ("encryption scheme"), certain computations can be performed even when the data is in encrypted form with guarantees to generate correct results. Homomorphic encryption generally supports addition, subtraction, and multiplication over encrypted data. Division and comparisons may not be supported, and multiplication may quadratically introduce noise to ciphertexts. When noise increases past a threshold, the decryption can fail. In this regard, multiplication operations can be bounded. Embodiments described herein in particular approximate neural network functions used in performing neural network computations such that homomorphic encryption may operate consistently with encrypted data in providing accurate encrypted results based on encrypted data. It is contemplated that in some embodiments, no modifications are made to the homomorphic encryption while modifications are made to the functions of the neural network models based on approximations to allow for performing computations on encrypted data in the neural network.

As described above, homomorphic encryption includes limitations on supported operators. In this regard, implementing homomorphically encrypted data in a neural network is by extension limited. However, by modifying functions in the neural network, the limitations of the homomorphic encryption can be overcome. In particular, a neural network can be a connected neural network or a convolutional neural network. The neural network may support three kinds of operations: convolution, pooling, and normalization.

In convolution operations, the basic equation is $z_j = \sigma(\Sigma_{k=1}^{K} w_{jk} x_k)$ where $z_j$ is the jth unit in the upper layer, and $\{x_k\}_{k=1}^{K}$ are the units in the lower layer, which are connected with $z_j$. $\{w_{jk}\}_{k=1}^{K}$ are the weights on the edges connecting $z_j$ and $\{x_k\}_{k=1}^{K}$. To compute $z_j$, a weighted sum of $\{x_k\}_{k=1}^{K}$, which is $\Sigma_{k=1}^{K} w_{jk} x_k$, then the sum is fed to an activation function $\sigma(\cdot)$. Since the encryption scheme can do addition and multiplication, the weighted sum $\Sigma_{k=1}^{K} w_{jk} x_k$ is computable since the encryption scheme only involves additions and multiplications. The major problem is the activation function.

Typical activation functions include division (e.g., sigmoid) and comparison (e.g., rectified linear), which are not supported by the encryption scheme. To solve this, embodiments described herein use polynomials to approximate the non-polynomial activation functions. Polynomials only involve additions and multiplications, which are supported by the encryption scheme. With the embodiments described herein approximation of neural network functions can approximate the activation functions with polynomials expressions, as such, activation functions can be computable under the encryption scheme.

The second operation is pooling, which tries to reduce variances. The two popular pooling schemes are average pooling $$z_j = \frac{1}{K} \sum_{k=1}^{K} x_k$$

and max pooling $z_j = \max(x_1, x_2, \ldots, x_K)$. In average pooling, to compute $z_j$ in the upper layer, the average of $\{x_k\}_{k=1}^{K}$ is taken in the lower layer which are connected with $z_j$. Since K is fixed, $$\frac{1}{K}$$

is pre-computed and multiplied with $\Sigma_{k=1}^{K} x_k$ on the fly. Thereby, average pooling can be doable under the encryption scheme. In max pooling, the max value is taken among $\{x_k\}_{k=1}^{K}$, which involves comparison and is not supported by the encryption scheme.

Figure 3:
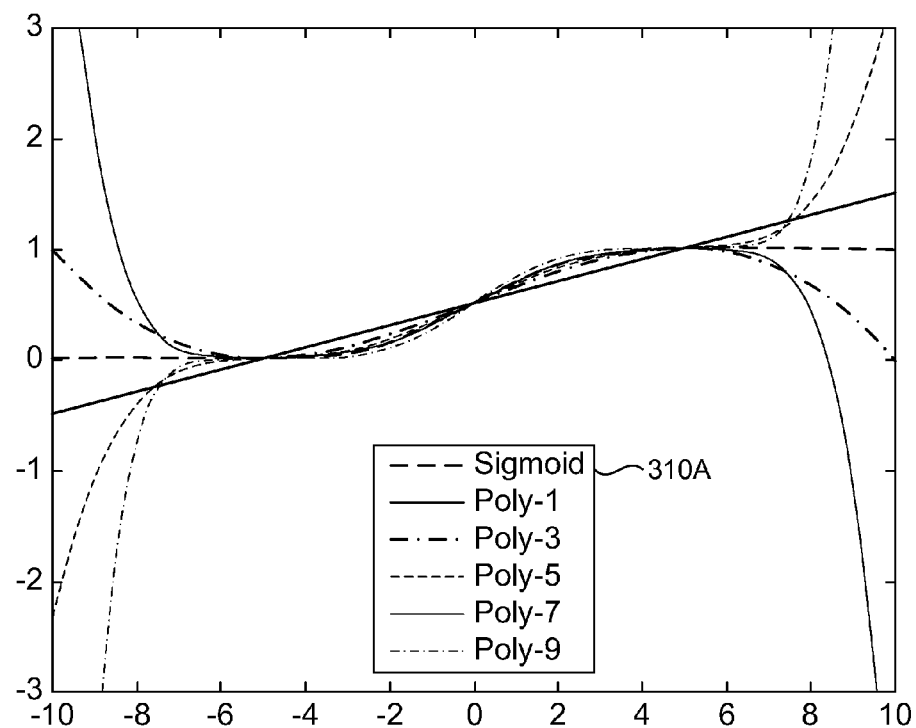
FIG. 3 is a block diagram of an exemplary operating environment for performing neural network computations based on modified neural network functions, in accordance with embodiments described herein.
Figure 3:
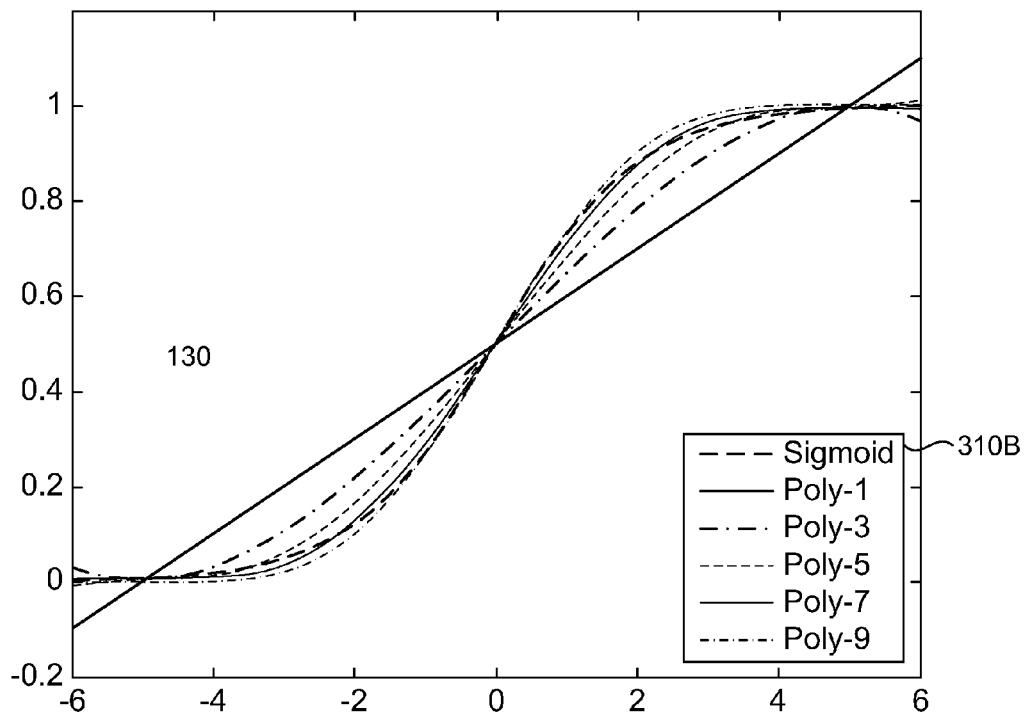

The third operation is normalization, which involves division and is not computable by the encryption scheme. To make the activation functions computable under the encryption scheme, polynomials can be used to approximate activation functions. Specifically, two activation functions can advantageously be considered: sigmoid and rectified linear. Two approximation methods: Chebyshev approximation and polynomial regression may be used. Chebyshev series can be used to approximate sigmoid function. Chebyshev series $\Sigma_{n=1}^{\infty} a_n T_n(x)$ is a linear combination of basis polynomials $\{T_n(x)\}_{n=1}^{\infty}$. These basis polynomials are called Chebyshev polynomials and are orthogonal to each other. To approximate the sigmoid function $\sigma(x) \approx \Sigma_{n=1}^{N} a_n T_n(x)$ with the first N basis, the coefficient $a_n$ of $T_n(x)$ is determined. Since these basis are orthogonal to each other, $a_n$ can be computed by taking the inner product $a_n = \langle \sigma(x), T_n(x) \rangle$ between $\sigma(x)$ and $T_n(x)$. The closed form Chebyshev polynomial approximation of sigmoid is $$\sigma(x) \approx \left(\frac{r+x}{2r}\right)^{q+1} \sum_{\mu=0}^{p} \binom{\mu+q}{\mu} \left(\frac{r-x}{2r}\right)^{\mu}$$

which has three parameters r, p, q as shown in FIGS. 3A and 3B

FIGS. 3A and 3B illustrate the plots of Chebyshev approximations of sigmoid function. FIG. 3A shows the plots over interval [−10, 10]. FIG. 3B shows the plots over interval [−6,6]. The sigmoid function is illustrated by 310A and 310B and the other curves are Chebyshev polynomials with different degrees. The degree of a Chebyshev polynomial equals to p+q+1. From the plots, we can that observe the following: (1) On the interval [−6,6], Chebyshev polynomials with order greater than 5 achieves a good approximation of sigmoid; (2) Outside the interval [−6,6], the polynomials diverge from sigmoid and the approximation is bad; and (3) as the degree of polynomials is increased, the approximation becomes better.

The input of sigmoid function can spread quite a large range. Approximating sigmoid well only on the interval [−6,6] is may not be sufficient. To solve this, another parameter r may be tuned. A larger r can bring in a larger interval (centered at 0) where the approximation can be better.

Figure 4A:
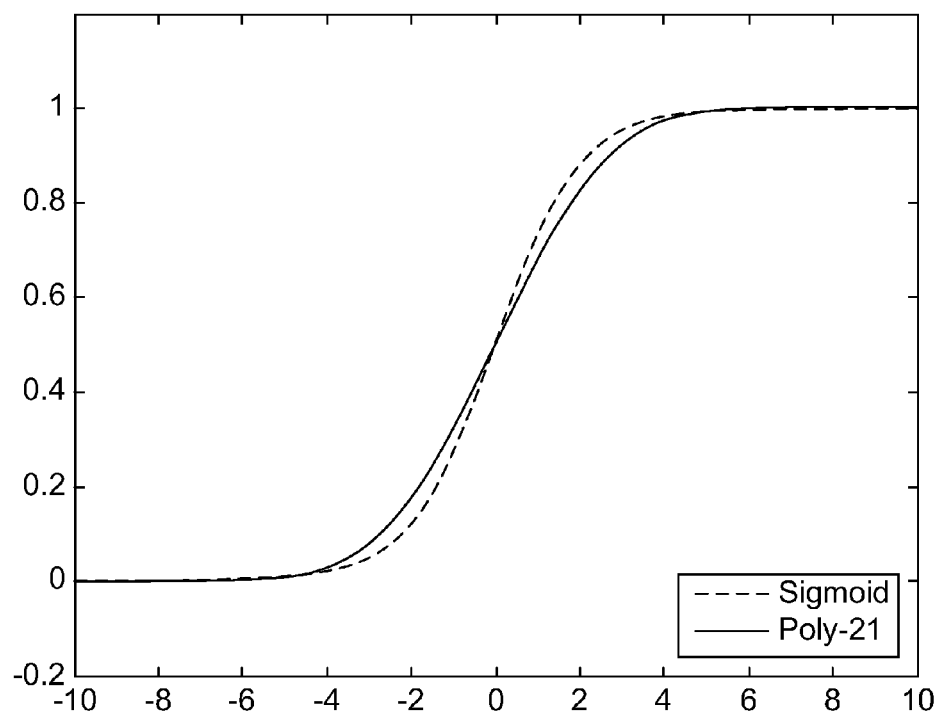
FIGS. 4A-4B are graphical representations of approximations of neural network functions in neural network training and neural network computations, in accordance with embodiments described herein.
Figure 4B:
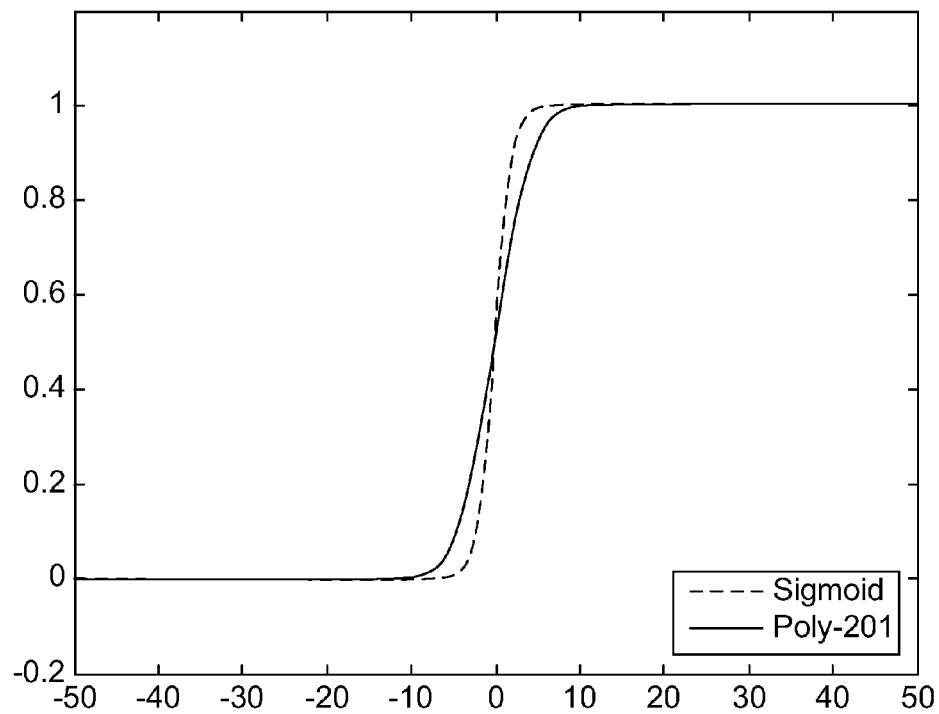

With reference to FIGS. 4A and 4B, FIGS. 4A and 4B illustrate that with an increase in r to 10, a good approximation on [−10,10] can be achieved. Further increasing r to 50, a good approximation on [−50, 50] can be achieved. However, to achieve good approximation under a larger r may come at some detriment; the degree of polynomials may need to be increased accordingly. For r=10, to approximate sigmoid well, a 21-degree polynomial can be implemented. For r=50, a 201-degree polynomial can be implemented. As discussed above, high degree polynomials may impose a huge burden to the encryption scheme.

With continued reference to FIGS. 4A and 4B: Chebyshev approximation of sigmoid function under different r Chebyshev approximation may necessitate calculating inner products between functions, which involves computing integration. For some functions, taking the integration is hard, if not impossible. To solve this, the second approximation method: polynomial regression can be used. To approximate a function $f(x)$, $(x, f(x))$ pairs are generated from this function, and polynomials can be utilized to do regression over these points to obtain the best fitting polynomial. This method can be implemented to approximate rectified linear function $f(x)=\max(0, x)$. A 100K $(x, f(x))$ pairs can be sampled uniformly from this function, then a polynomial can be used to fit these points. The optimal solution of this regression problem provides a polynomial approximation of the rectified linear function.

Figure 5:
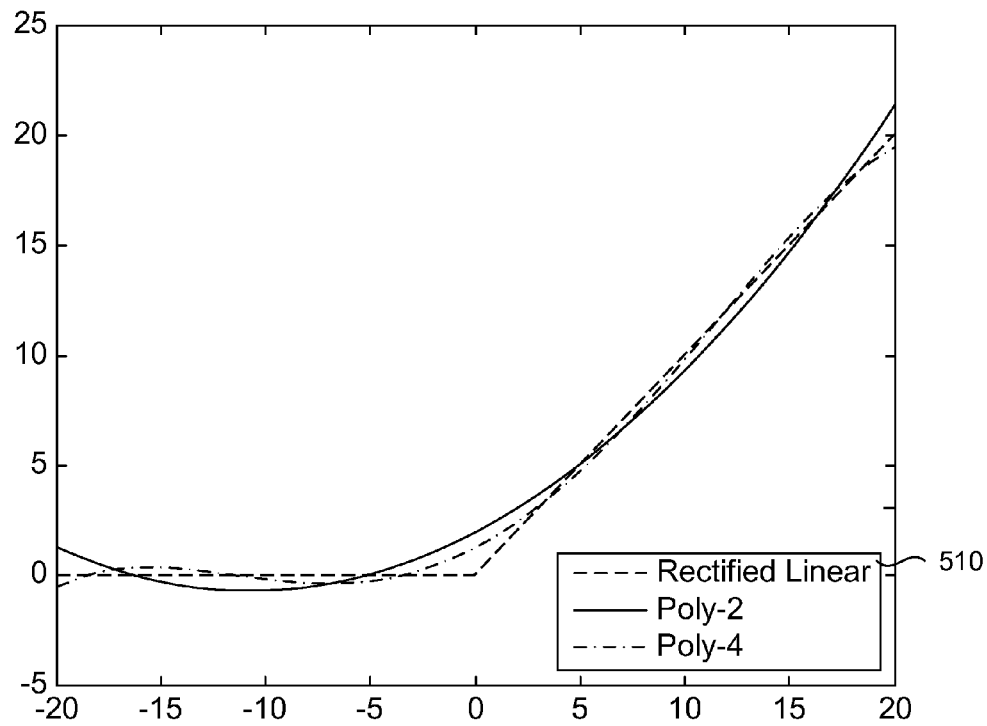
FIG. 5 is a graphical representation of approximations of neural network functions in neural network training and neural network computations, in accordance with embodiments described herein.

With reference to FIG. 5, FIG. 5 illustrates the polynomial approximation of rectified linear by doing polynomial regression. The rectified linear function is illustrated using 510. The other two curves are polynomials with different degrees. As can be seen from the plot, the regression method can achieve very good polynomial approximations of rectified linear function. As the degree of polynomials is increased, the approximations become better.

As the neural network computations are performed with polynomials approximations of activation functions, the neural network models can be trained specifically to accommodate the polynomial approximations. In a first training workflow, the neural network can be trained with original activation functions and neural network computations (e.g., predication computations) can be performed with polynomial approximations. In a second training workflow, polynomial approximations can be used in both training and testing.

Figure 6:
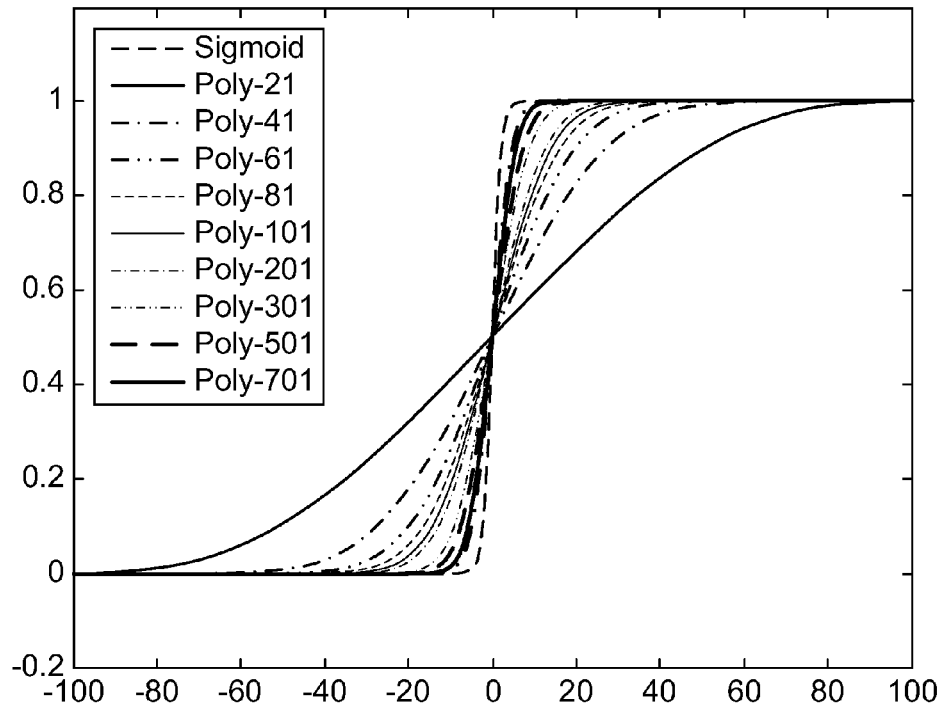
FIG. 6 is a graphical representation of approximations of neural network functions in neural network training and neural network computations, in accordance with embodiments described herein.
Figure 7A:
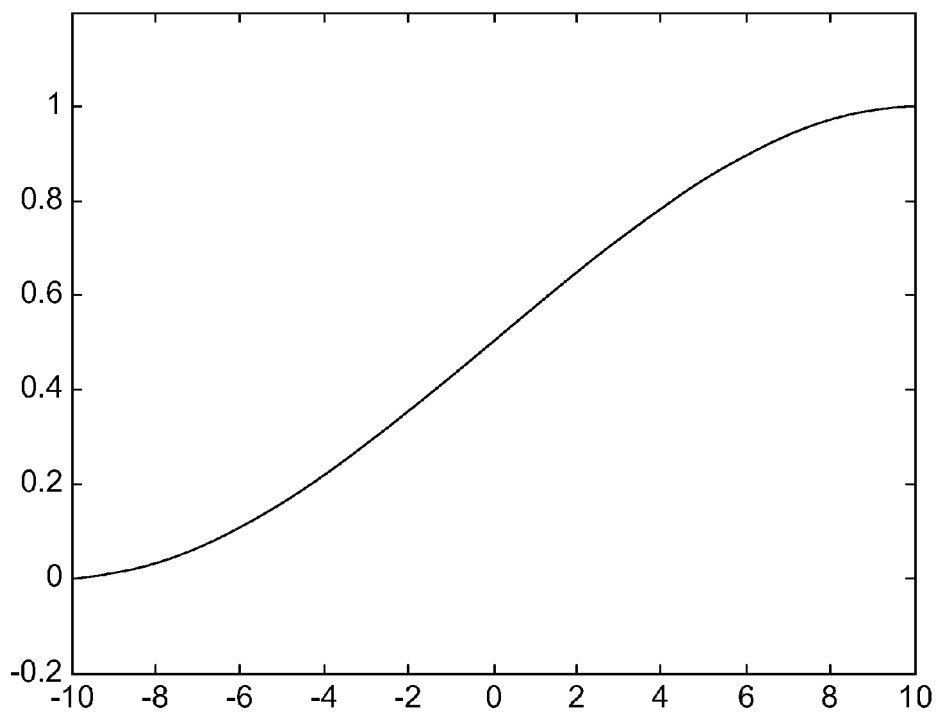
FIGS. 7A-7D are graphical representations of approximations of neural network functions in neural network training and neural network computations, in accordance with embodiments described herein.
Figure 7B:
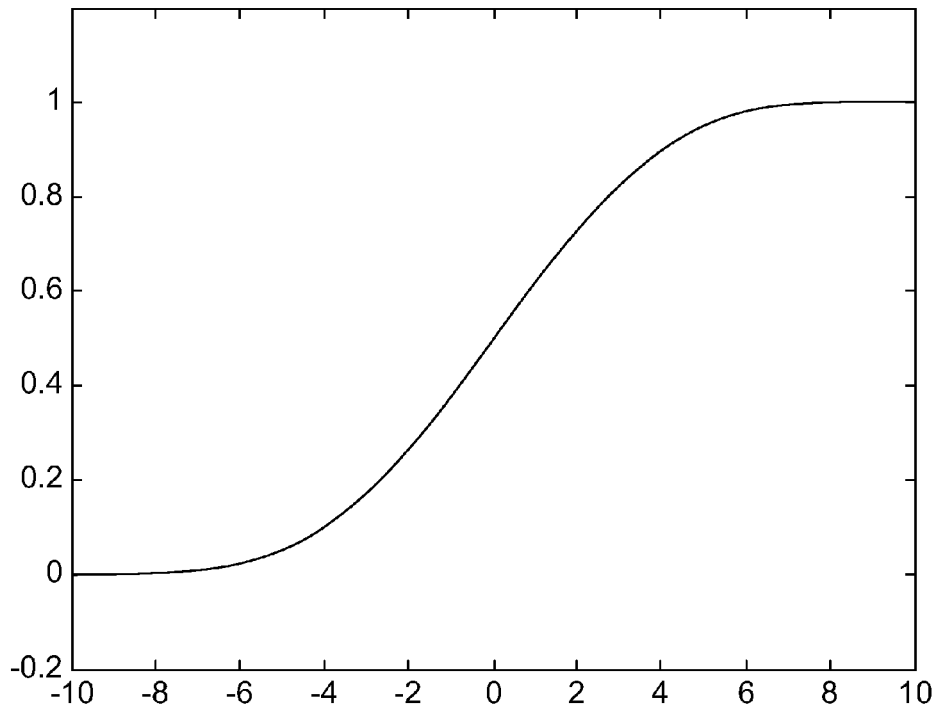
Figure 7C:
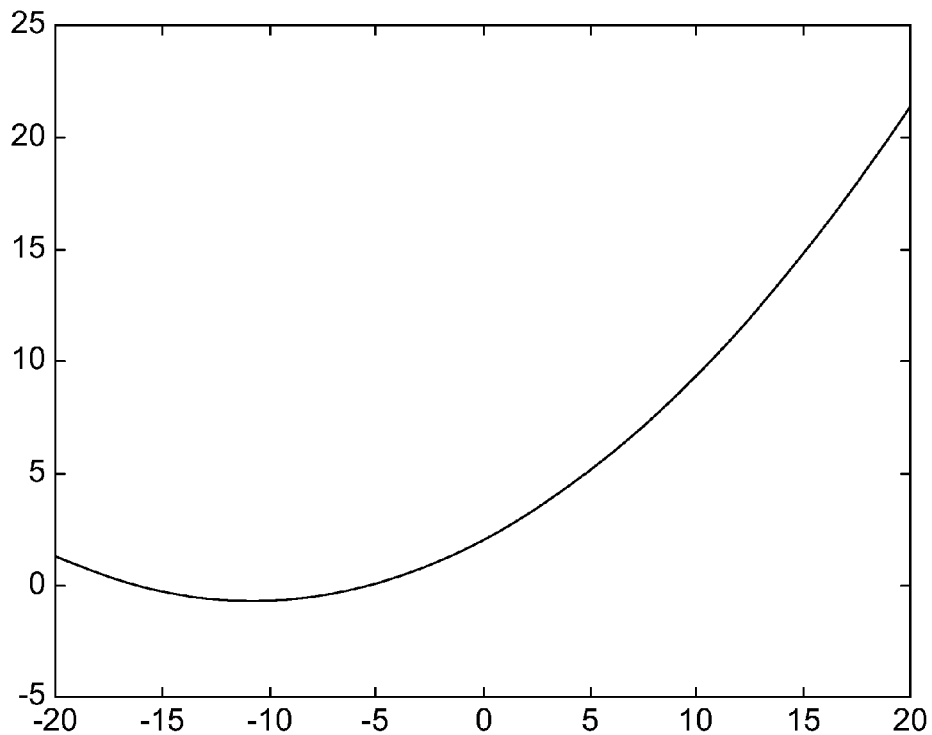
Figure 7D:
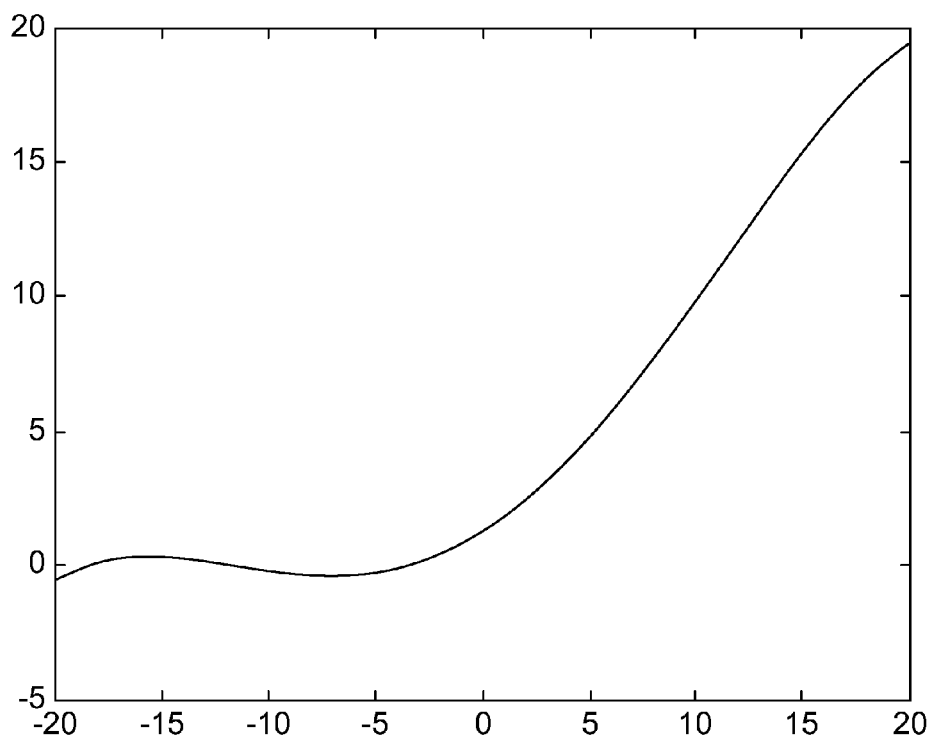

With reference to the first training workflow, it is contemplated that a conventionally trained neural network can be utilized and provided for neural network computation. The neural network training can exclude time-consuming training and remarkable tuning. However, the first training workflow does include replacing activation functions with modified activation functions in the neural network when performing computations. Specifically for performing neural network prediction computations, the activation functions can be replaced with polynomial approximations. The neural network trained with the first training workflow may need high degree polynomial to achieve descent performance. By way of example, with reference to FIG. 6, consider properly approximating the sigmoid function on the interval [−100,100], polynomials of degree at least 301 can be utilized. However, polynomials of such a degree may be a burden to the encryption scheme.

With reference to the second training workflow, the activation functions can be replaced with their polynomial approximations in both training and testing. The polynomial approximations are modified and even potentially new activation functions which not only emulate the properties of original activation functions like sigmoid and rectified linear, but also have low degrees to facilitate computation under homomorphic encryption.

FIGS. 7A-7D illustrate some examples of the new activation functions stemmed from approximating the existing ones. These new activations functions preserve some properties of the existing ones. For instance, the trending of the two functions in FIGS. 7A and 7B can be quite similar to that of sigmoid function. The functions in FIGS. 7B and 7C can be similar to rectified linear. One attractive trait of these polynomial functions may be that their degrees are low, which facilitates computing under the homomorphic encryption.

It is contemplated that in some embodiments, in order to speed up training, a third training workflow may be implemented. The third training workflow comprises a pre-training and fine-tuning strategy. In the pre-training phrase, the original activation functions (sigmoid, rectified linear) may be implemented in training. After some iterations, low-degree polynomial approximations (low degree) can then be implemented to perform fine-tuning. Performing pre-training with the original activation functions may advantageously cause the parameters converge to a point which is close to the optimal solution in a faster way than using the polynomial approximations directly from the very beginning. Performing a fine-tuning with the polynomial approximations can advantageously cause the model to adapt to the low degree polynomials. As such, neural network models can be trained using the first, second, or third training workflow which prepares the neural models for performing computations on encrypted data to generate encrypted results data.

Accordingly, in a first embodiment described herein, one or more computer storage media having computer-executable instructions embodied thereon that, when executed, by one or more processors, causes the one or more processors to perform a method for generating encrypted neural network results data, is provided. The method includes receiving encrypted data having ciphertext. The encrypted data is encrypted with an encryption scheme that allows for computations on the ciphertext to generate encrypted results data. The method further includes performing neural network computations on the encrypted data. The neural network computations are performed using approximations of neural network functions to generate encrypted neural network results data from encrypted data. The method also includes generating encrypted neural network results data using the approximations of neural network functions. The method includes communicating the encrypted neural network results data.

In a second embodiment described herein, a computer-implemented method for generating encrypted neural network results data using approximations of neural networks functions is provided. The method includes accessing neural network having a plurality of interconnected nodes including an input layer and output layer. The method further includes training the neural network to produce one or more encrypted neural network results based on encrypted data. Training the neural network comprises training the neural network to perform neural network computations with approximations of neural network functions.

In a third embodiment described herein, a computer system for generating encrypted neural network results data using approximations of neural networks functions is provided. The system includes a neural network training component configured for: selecting a neural network having a plurality of interconnected nodes including an input layer and output layer; and training the neural network to produce one or more encrypted neural network results based on encrypted data. The training the neural network comprises training the neural network to perform neural network computations with approximations of neural network functions. The system also includes a neural network computation component configured for: receiving the encrypted data having ciphertext, the encrypted data is encrypted with an encryption scheme that allows for computations on the ciphertext to generate encrypted results data; performing neural network computations on the encrypted data, the neural network computations are performed using approximations of neural network functions to generate encrypted neural network results data from encrypted data; generating encrypted neural network results data using the approximations of neural network functions; and communicating the encrypted neural network results data. The system further includes a client component configured for: encrypting data using an encryption scheme, wherein the encryption scheme is a homomorphic encryption scheme; communicating the encrypted data to be used in neural network computations; receiving encrypted results data based on the encrypted data; and decrypting the encrypted results data to access unencrypted results.

Figure 8:
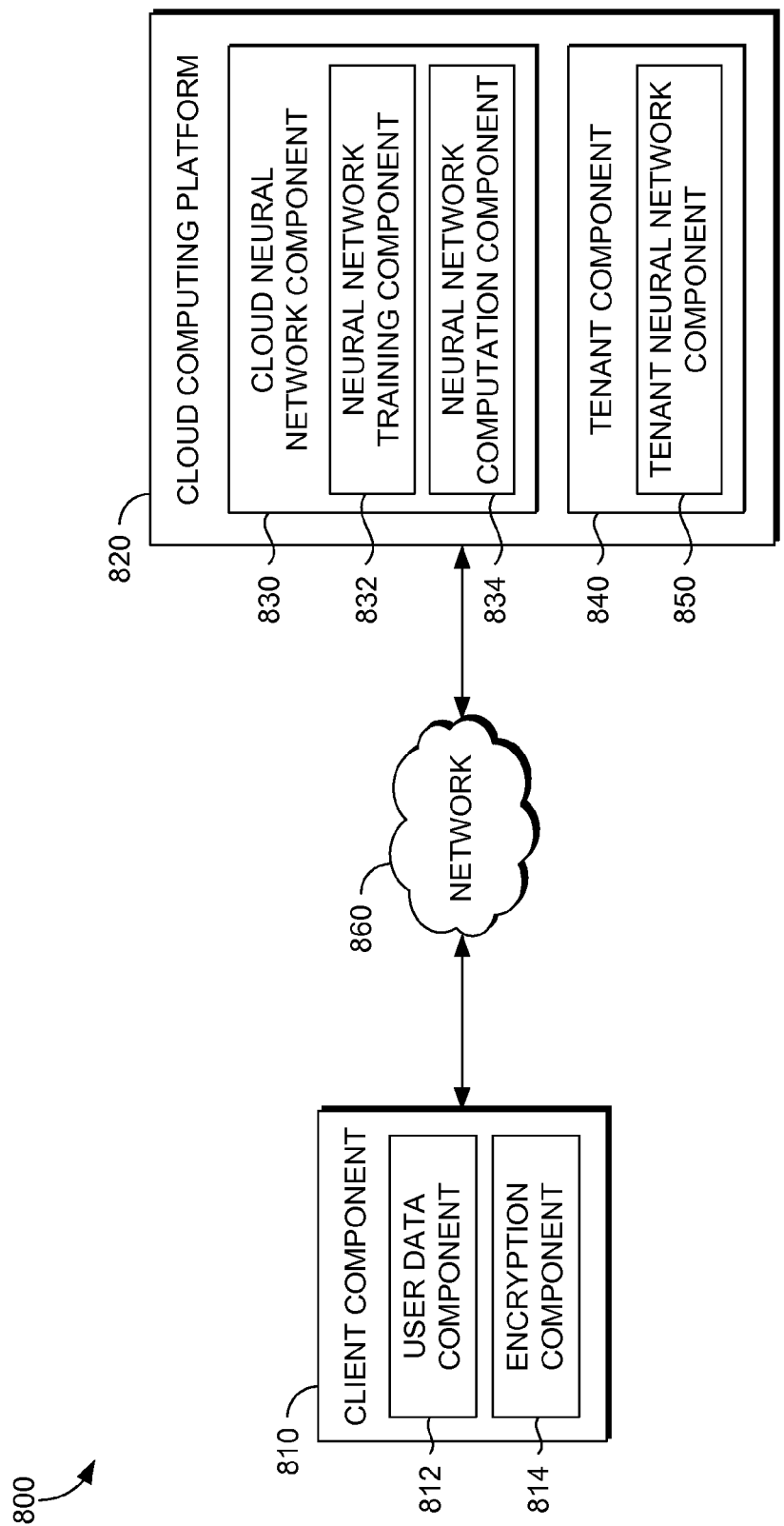
FIG. 8 is a block diagram of an operating environment for performing neural network computations based on approximations of neural network functions, in accordance with embodiments described herein.
Figure 9:
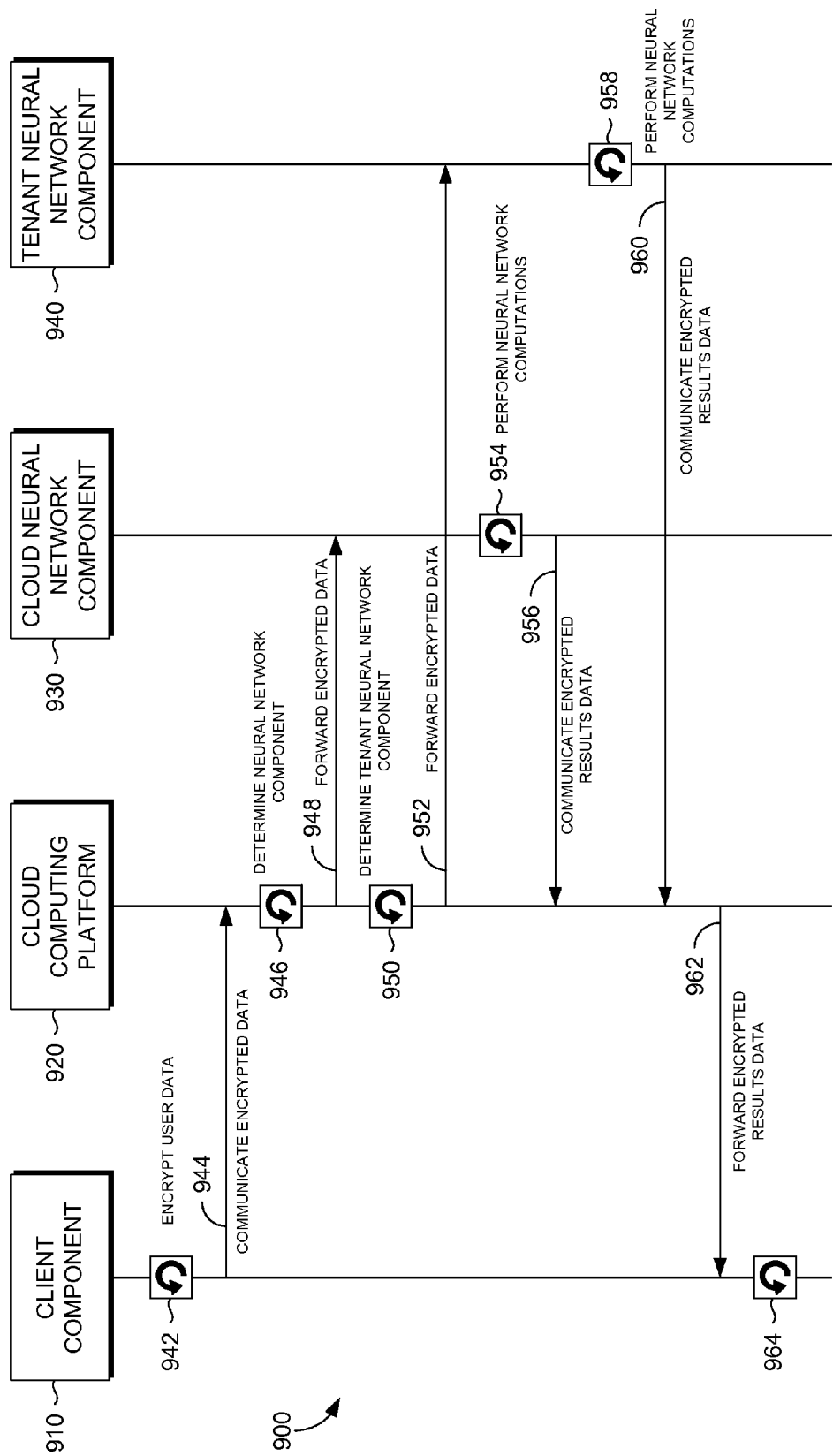
FIG. 9 is a schematic showing an exemplary method for performing neural network computations based on modified neural network functions, in accordance with embodiments described herein.

Turning now to FIG. 8, a block diagram depicting a neural network system 800 in an operating environment suitable for use in implementing embodiments described herein is provided. Generally, the neural network system 800 may be used for, among other things, performing neural network computations on encrypted data. A user can encrypted user data and communicate the encrypted data such that neural network computations (e.g., predication computations) are performed on the encrypted data to produce encrypted results data that upon being communicated back to the user can be decrypted to view the results data. In embodiments, access to the neural network system 800 can be further restricted based on an encryption mechanism.

Among other components not shown, the neural network system 800 may generally include a client component 220 having a user data component 812, and an encryption component 8124, a cloud computing platform 820 having a cloud neural network component 830 comprising of a neural network training component 832 and a neural network computation component 834, and the cloud computing platform 820 further comprising a tenant component 840 having a tenant neural network component 842, all in communication with each other using a network 850. The network 50 may include, without limitation, one or more local area networks (LANs) and/or wide area networks (WANs). Such networking environments are commonplace in offices, enterprise-wide computer networks, intranets and the Internet.

In some embodiments, one or more of the illustrated components and/or modules may be implemented as stand-alone applications. In further embodiments, one or more of the illustrated components and/or modules may be implemented via a computing device, as an Internet-based service, and/or as a module within the client component 810 and the cloud computing platform 820. It will be understood by those of ordinary skill in the art that the components and modules illustrated in FIG. 8 are exemplary in nature and in number and should not be construed as limiting.

Any number of components and/or modules may be employed to achieve the functionality described herein. For example, any number of client components, cloud computing platforms and components thereof and networks may be employed in the neural network system 800 within the scope of embodiments hereof. Each may comprise a single device/interface or multiple devices/interfaces cooperating in the neural network system 800. For instance, multiple devices and/or modules arranged in a distributed environment may collectively provide the cloud neural network component and the tenant neural network component functionality described herein. The phrase "application" or "service" as used herein may broadly refer to any software, or portions of software, that run on top of, or access storage locations within, a computing device and/or multiple computing devices, such as multiple computing devices in a data center.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the neural network system 800, may be carried out by a processor executing instructions stored in memory.

Turning now to the various components that may be included in the neural network system 800, the client component 810 can be any type of computing device 1200 described below with reference to FIG. 12, for example. The client component 810 implements the user data component 812 and the encryption component 814. The user data component 812 is responsible for storing and providing access to user data. User data can include any type of data which can be used by a neural network to perform computations and provide results.

In particular, user data can be used to perform prediction computations to generate results that predict information based on the provided data. The user data component can specifically include data that is subject to regulatory compliance, security, and privacy restrictions. By way of example, medical records, financial data, Personally Identifiable Information (PII) data, and government documents can be associated with restrictions that limit the capacity for machine learning operations to be performed on the user data. As such, the user data can be encrypted prior to performing neural network computations.

The encryption component 814 is responsible encrypting and decrypting user data. As discussed above, because of the sensitive nature of different types of user data, the user data can be encrypted to limit access to the user data. As such, the encryption component 814 can be configured to access user data and encrypt the user data using an encryption scheme. Encrypting data, using the encryption component, encodes the data such that only authorized parties can read the data. When data are encrypted, the content of the data is denied to an interceptor.

The encryption component 814 can encrypt the user data using different types of encryption schemes. The encryption component can specifically encrypt the user data using a homomorphic encryption scheme. The homomorphic encryption scheme can be a fully homomorphic encryption scheme. A fully homomorphic scheme may preserve the ring structure of plain-texts of the encrypted data. The homomorphic scheme can be encrypt the data such that neural network computations can be performed on encrypted data.

It is contemplated the encryption component can further encrypt the encrypted data to restrict access to a particular neural network. Encrypting the neural network comprises encrypting access to the neural network based on an encryption scheme. The neural network can be encrypted using public key cryptography. For example, encrypted user data can be communicated in a secured manner based on a public key encryption that allows access to the neural network only when a private key is used to decrypt the encryption access to the neural network such that neural network computations can be performed on the encrypted data. By way of example, a cloud computing platform provider may support a third party provider (tenant) of a neural network running as a service or application on the cloud computing platform. A user can encrypt the data to restrict access only to the particular neural network on which the encrypted data is intended to be computed on. In this regard, embodiments described herein can provide two levels of encryption, first, the data is encrypted, and access to a particular neural network is further made possible via encryption.

The output results data received at the encryption component is encrypted data which may also be communicated in a restricted manner as well. As such, the encryption component can be used to decrypt access to output results data encrypted with a public key. In addition, the encryption component can be configured to decrypt the output results data which is generated from encrypted user data. Decrypting the output results data can be based on the homomorphic encryption scheme used in encrypting data. When the output results data is decrypted, the user can then have access to the plaintext format of the output results data.

The cloud computing platform 820 is configured to support a cloud neural network component 830 and the tenant neural network component 850 in a distributed system. It is contemplated that the tenant neural network component 850 comprises similar components and functionality of the cloud neural network component 830 described herein. The cloud computing platform can rely on shared resources between the different components to maximize effectiveness of operations. The cloud computing platform can support a neural network (e.g., cloud neural network component) that is a service or application offered by a provider of the cloud computing platform 820. The cloud computing platform 820 can also manage a tenant component 840 to support a neural network (e.g., tenant neural network component) of a third party entity or tenant operating their service or application in the cloud computing platform 820. In this regard, the cloud computing platform is configured to support two different types of implementations of neural network models in the cloud computing platform.

The cloud computing platform 820 can be configured to support secured access to neural network components. In particular, access to a third party tenant neural network component (e.g., tenant neural network component 850) can be secured using an encryption mechanism. By way of example, access to the tenant neural network component 850 can be encrypted at the client component 810 using the encryption component 814. The encryption component 814 can use a public key to encrypt the encrypted user data from the client component 810. The cloud computing platform may receive the encrypted data that is further encrypted with a public key for access to the particular tenant neural network component 850. As such, the cloud computing platform 820 cannot access the encrypted data without a private key to decrypt the public key. The cloud computing platform communicates the encrypted data with the public key where the tenant neural network component can access the particular neural network to begin performing neural network computations on the encrypted data. In this regard, some embodiments described herein contemplate two different types of encryptions—encrypted data and neural network secured data to prevent any other neural network component from performing computations on the encrypted data.

With continued reference to FIG. 2, the cloud neural network component 830 includes a neural network training component 832 and a neural network computation component 834. The neural network training component 832 is generally responsible for training the neural network based on a selected training workflow. In particular, neural network training component 832 can receive an untrained neural network model to be trained to support neural network computations as described herein. The neural network training component 832 performs training through an iterative process that involves one of a first training workflow, a second training workflow or a third training workflow.

In a first training workflow, the neural network can be trained with original activation functions and neural network computations (e.g., predication computations) can be performed with polynomial approximations. Neural network computations can include test neural network computations during a training phase. In a second training workflow, polynomial approximations can be used in both training and testing. The activation functions can be replaced with their polynomial approximations in both training and testing. The polynomial approximations are approximations of activation functions. In embodiments, the polynomial approximations are truly new activation functions which not only emulate the properties of original activation functions like sigmoid and rectified linear, but also have low degrees to facilitate computation under homomorphic encryption.

The third training workflow comprises a pre-training and fine-tuning strategy. In the pre-training phrase, the original activation functions (sigmoid, rectified linear) may be implemented in training. After some iterations, low-degree polynomial approximations (low degree) can then be implemented to perform fine-tuning. Performing pre-training with the original activation functions may advantageously cause the parameters converge to a point which is close to the optimal solution in a faster way than using the polynomial approximations directly from the very beginning. Performing a fine-tuning with the polynomial approximations can advantageously cause the model to adapt to the low degree polynomials. As such, neural network models can be trained using the first, second, or third training workflow which prepares the neural models for performing computations on encrypted data to generate encrypted results data.

The neural network computation component 834 is responsible for processing the encrypted data using neural network models. It is contemplated that the neural network computation component can also further be configured to process unencrypted data to perform neural network computations. With particular reference to encrypted data, encrypted data may be communicated to the cloud computing platform 820 from the client component 810. The cloud neural network component 830 can receive the encrypted data and provide the encrypted data to the neural network computation component 834 to perform computations on the encrypted data based on the trained neural network. As discussed, the neural network can be trained using the several different workflows in neural network training component 832.

The neural network computation component 834 is further configured to generate encrypted results data from the encrypted data upon performing neural network computations. In particular, the neural network computations are performed on encrypted data and encrypted data results are generated. Performing the neural network computations to generate encrypted results is based on approximations of functions of the neural network. Specifically, the approximations of neural network functions can be approximations of activation functions, as discussed herein, where the activation functions are modified to perform computations using polynomial expressions that approximate the activation functions. The encrypted results data are communicated to the user associated with the encrypted data such that the user decrypts the encrypted data based on the encryption scheme.

Turning now to FIG. 5, a schematic that illustrates an exemplary method 900 for performing neural network computations on encrypted data using modified functions. The schematic includes a client component 910, a cloud computing platform 920, a cloud neural network component 930 and a tenant neural network component 940. The cloud neural network component may be a service application offered by the provider of the cloud computing platform 930 and the tenant neural network component can be service application of a tenant that is supported on the cloud computing platform.

At 942, the client component may access, using an encryption component, user data in a user data component. The user data can include data subject to restricted access. Such user data can include financial user data, medical records, or PII data. The user data can be encrypted to comply with regulations that restrict access to the user data. The user data can be encrypted using a homomorphic encryption scheme that supports performing neural network computations on the encrypted data. The encrypted user data can further be encrypted for secured access to the neural network. The neural network access encryption may be a public cryptography encryption that comprises a public key. At 944, the encrypted data is communicated with the public key.

At block 946, the cloud computing platform 920 receives the encrypted data with the public key. Because the data is secured with the public key, the cloud computing platform 920 cannot perform neural network computation on the encrypted data without access to a private key to provide access to the encrypted data. The cloud computing platform 920 can make a determination whether the encrypted data is to be processed using the cloud neural network component 930 or the tenant neural network component 940. It is contemplated that the cloud neural network component 930 and tenant neural network component 940 can include features described herein with reference to the cloud neural network component 830. In this regard, cloud neural network component and tenant neural network component can include neural network training components and neural network computation components that facilitate performing operations described herein. As such, the cloud computing platform can forward the encrypted data to the cloud neural network component when the encrypted data is processed via the service application offered by the cloud.

At 950, when the encrypted data is to be processed by a tenant neural component, the cloud computing platform can determine the tenant neural network component to receive the encrypted data and forward the encrypted data for process. Again, in some embodiments where the neural network encrypted data is further encrypted to secured access, a public key can be communicated to allow access to the neural network with a private key at the neural network component. At 952, the encrypted data is forwarded to the tenant neural network component.

At 954, the cloud neural network can access the encrypted data to perform neural network computations on the encrypted data using approximations of neural network functions as discussed herein. At 958 the tenant neural network component can also access the encrypted data to perform neural network computations on the encrypted data using approximations of neural network functions. In embodiments where the access to the neural network (cloud or tenant neural network component) is secured, a private key can be used to decrypt the access encryption and provide access to the neural network. In this regard, only the neural network component that has a private key for the public key communicated with the encrypted data may perform neural network computation on the encrypted data.

Performing neural network computations with embodiments described herein generates encrypted result data. The results data is encrypted such that the contents of the results data cannot be accessed until decrypted based on the encryption scheme used to encrypt the data. As such, at 956 and at 960, the cloud neural network component 930 and the tenant neural network component 940 can communicate the encrypted results data to the cloud computing platform that facilitates forwarding, at 962, the encrypted results data. At 964, the client component can receive the encrypted results data and decrypt the data based on the encryption scheme used to encrypt the data. When the data is decrypted, the client component 910 may then provide access to the results data.

Figure 10:
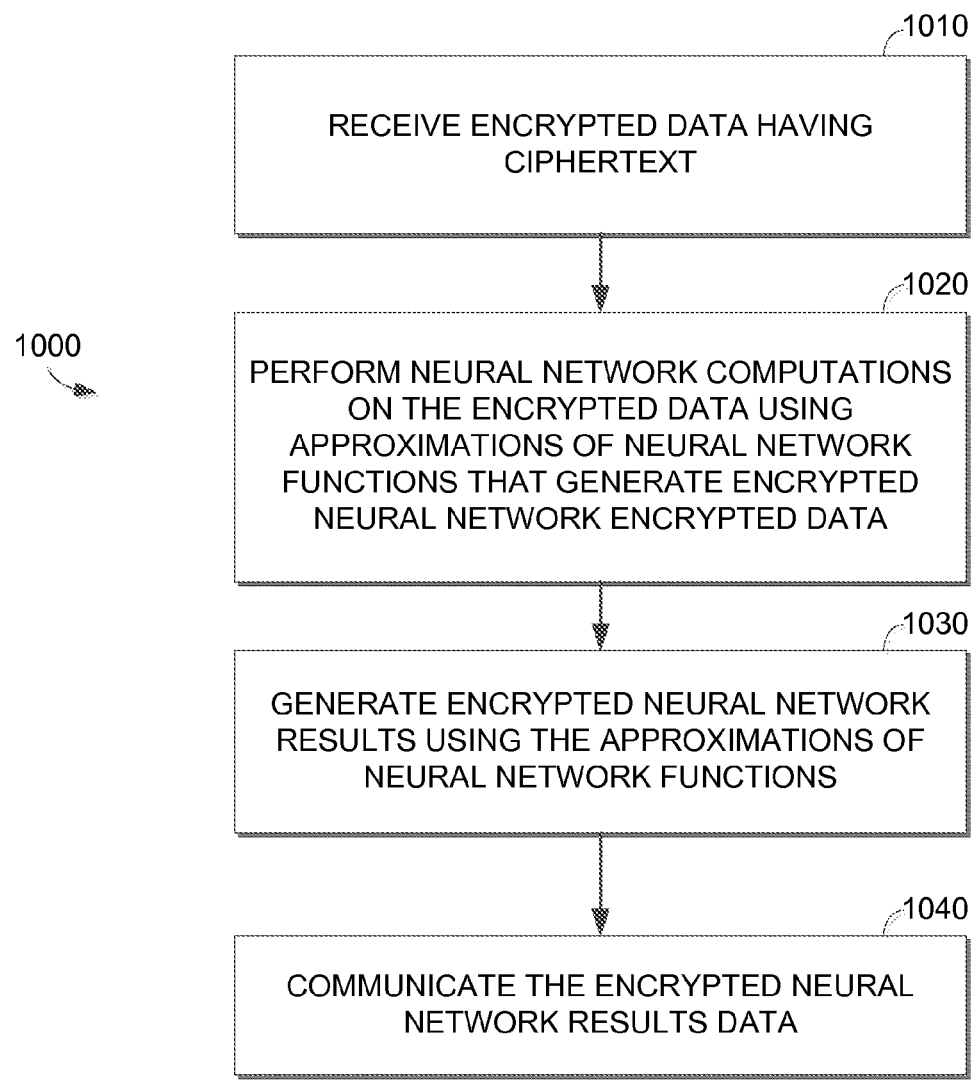
FIG. 10 is a flow showing an exemplary method for performing neural network computations based on modified neural network functions, in accordance with embodiments described herein.

Turning now to FIG. 10, a flow diagram that illustrates an exemplary method 1000 for performing neural network computations based on approximations of neural network functions. At block 1010, encrypted data having ciphertext is received. The encrypted data is encrypted with an encryption scheme that allows for computations on the ciphertext to generate encrypted results data. At block 1020, neural network computations are performed on the encrypted data, the neural network computations are performed using approximations of neural network functions to generate encrypted neural network results data from encrypted data. At block 1030, encrypted neural network results data is generated using the approximations of neural network functions. At block 1040, the encrypted neural network results data is communicated.

Figure 11:
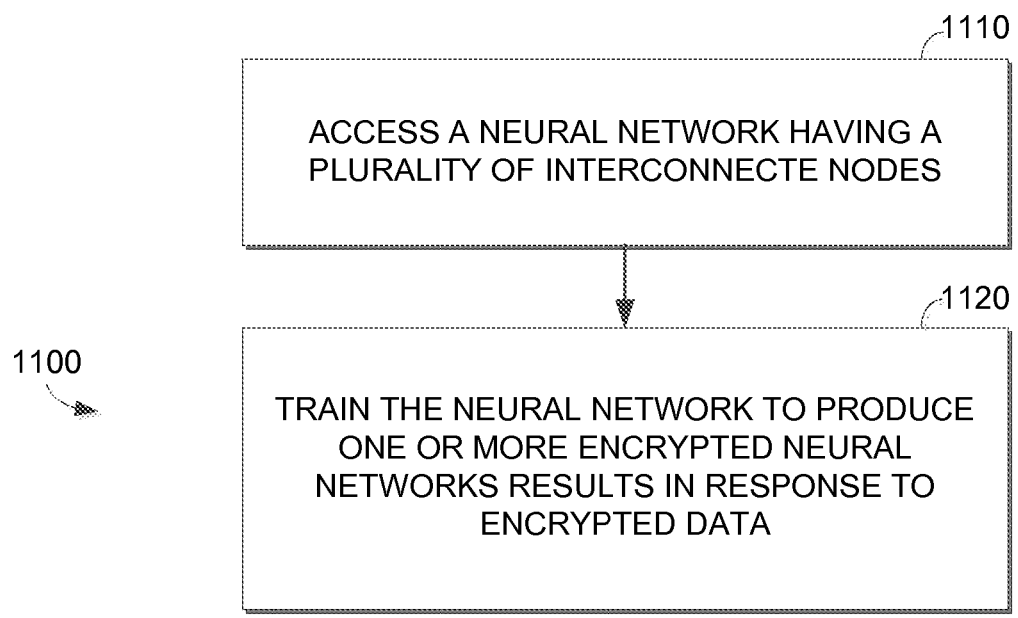
FIG. 11 is a flow showing an exemplary method for training a neural network for performing neural network computations based on modified neural network functions, in accordance with embodiments described herein.

Turning now to FIG. 11, a flow diagram that illustrates an exemplary method 1100 for performing neural network computations based on approximations of neural network functions. At block 1110, a neural network having a plurality of interconnected nodes including an input layer and output layer is accessed. At block 1120, the neural network is trained to produce one or more encrypted neural network results based on encrypted data. Training the neural network comprises training the neural network to perform neural network computations with approximations of neural network functions.

Having briefly described an overview of embodiments of the present invention, an exemplary operating environment in which embodiments of the present invention may be implemented is described below in order to provide a general context for various aspects of the present invention.

Figure 12:
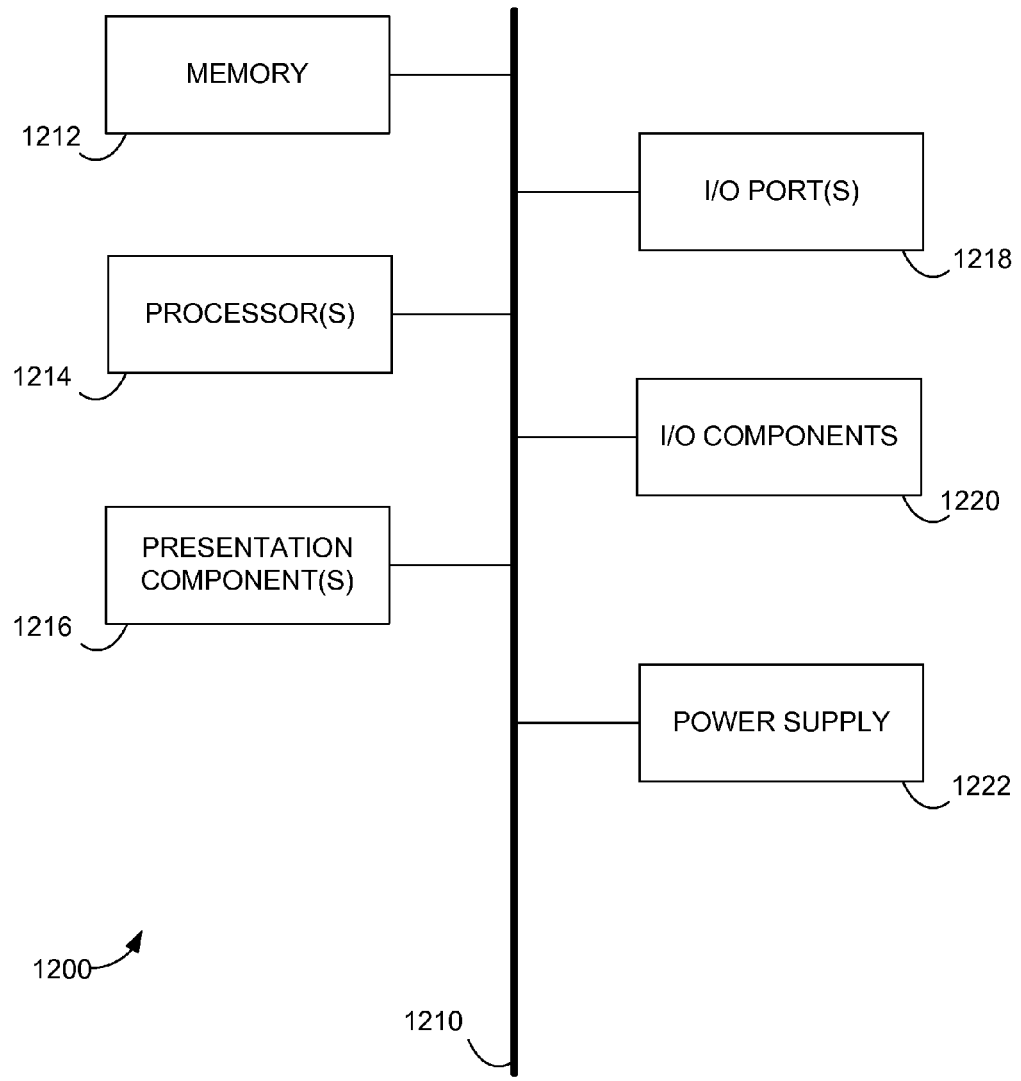
FIG. 12 is a block diagram of an exemplary computing environment suitable for use in implementing embodiments of the present invention.

Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

Embodiments of the presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media having computer-executable instructions embodied thereon that, when executed, by one or more processors, causes the one or more processors to perform a method for generating encrypted neural network results data, the method comprising:

receiving encrypted data having ciphertext, wherein the encrypted data is encrypted with an encryption scheme that allows for computations on the ciphertext to generate encrypted results data;

performing neural network computations on the encrypted data using a neural network, wherein the neural network computations are performed using approximations of neural network functions to generate encrypted neural network results data from encrypted data;

generating encrypted neural network results data using the approximations of neural network functions, wherein generating the encrypted neural network data results comprises performing neural network computations on the neural network trained to produce one or more encrypted neural network results based on encrypted data, wherein training the neural network comprises a training workflow that includes a pre-training phase and a fine-tuning phase, and wherein the pre-training phase utilizes the neural network functions for a defined number of iterations and the fine-tuning phase utilizes the approximations of the neural network functions, and wherein the training workflow reduces a number of iterations for the neural network to converge to an optimal solution; and communicating the encrypted neural network results data.

2. The media of claim 1, wherein the encrypted data is encrypted using a homomorphic encryption scheme, wherein the homomorphic encryption scheme is a fully homomorphic encryption scheme that supports performing neural network computations on encrypted data.

3. The media of claim 1, wherein the encrypted data is received with a public-key, wherein the public-key is used to encrypt access to a neural network for performing neural network computations.

4. The media of claim 1, wherein the approximations of neural network functions approximate activation functions, wherein the activation functions are approximated based on polynomial expressions.

5. The media of claim 1, wherein the approximations of neural network functions are approximated based on at least one of: Chebyshev approximation; and polynomial regression.

6. The media of claim 1, wherein the approximations of neural network functions are associated with one or more neural network operations selected from: a convolution operation, a pooling operation, and a normalization operation.

7. The media of claim 1, wherein generating the encrypted neural network data results further comprises the encryption scheme supporting addition operations, subtraction operations, and multiplication operations, and wherein the approximations of the neural network functions support division operations and comparison operations using polynomial expressions.

8. A computer-implemented method for generating encrypted neural network results data using approximations of neural networks functions, the method comprising:

accessing a neural network having a plurality of interconnected nodes including an input layer and output layer; and training the neural network to produce one or more encrypted neural network results based on encrypted data, wherein training the neural network comprises training the neural network to perform neural network computations based on a training workflow comprising a pre-training phase and a fine-tuning phase, wherein the pre-training phase utilizes neural network functions for a defined number of iterations and the fine-tuning phase utilizes approximations of the neural network functions, and wherein the training workflow reduces a number of iterations for the neural network to converge to an optimal solution.

9. The method of claim 8, wherein the approximations of neural network functions approximate activation functions based on polynomials.

10. The method of claim 9, wherein the polynomials are configured to emulate properties of the activation functions while preserving compatibility with homomorphic encryption.

11. The method of claim 9, wherein the activation functions include at least one of sigmoid function and a rectified linear function.

12. The method of claim 8, wherein the fine tuning phase operates to adapt the neural network to the approximations of the neural network functions.

13. A computer system for generating encrypted neural network results data using approximations of neural networks functions:

one or more hardware processors and memory configured for providing computer program instructions to the one or more hardware processors;

a neural network training component configured to execute on the one or more hardware processors for:

selecting a neural network having a plurality of interconnected nodes including an input layer and output layer; and training the neural network to produce one or more encrypted neural network results based on encrypted data, wherein training the neural network comprises training the neural network to perform neural network computations based on a training workflow comprising a pre-training phase and a fine-tuning phase, wherein the pre-training phase utilizes neural network functions for a defined number of iterations and the fine-tuning phase utilizes approximations of the neural network functions, and wherein the training workflow reduces a number of iterations for the neural network to converge to an optimal solution; and a neural network computation component configured to execute on the one or more hardware processors for:

receiving the encrypted data having ciphertext, wherein the encrypted data is encrypted with an encryption scheme that allows for computations on the ciphertext to generate encrypted results data;

performing neural network computations on the encrypted data using the neural network, wherein the neural network computations are performed using the approximations of the neural network functions to generate encrypted neural network results data from encrypted data;

generating encrypted neural network results data using the approximations of neural network functions; and communicating the encrypted neural network results data.

14. The system of claim 13, further comprising a client component configured for:

encrypting data using an encryption scheme, wherein the encryption scheme is a homomorphic encryption scheme;

communicating the encrypted data to be used in neural network computations;

receiving encrypted results data based on the encrypted data; and decrypting the encrypted results data to access unencrypted results.

15. The system of claim 14, wherein the client component is configured for:

encrypting the encrypted data using an encryption mechanism, wherein the encryption mechanism is public cryptography that is used to generate a public key; and communicating the encrypted data and the public key, wherein the public key is used to restrict access to a particular neural network.

16. The system of claim 15, wherein the neural network component is implemented in a cloud computing platform that supports a plurality of neural networks, wherein access to the particular neural network computation of a neural network model is restricted using the encryption mechanism.

17. The system of claim 13, wherein neural network component is further configured to simultaneously support neural network computations on unencrypted data.

* * * * *